(12) United States Patent
Morita et al.

(10) Patent No.: US 11,241,888 B2
(45) Date of Patent: Feb. 8, 2022

(54) INK JET RECORDING METHOD

(71) Applicant: Seiko Epson Corporation, Tokyo (JP)

(72) Inventors: Keisuke Morita, Matsumoto (JP);
Kazuyoshi Tanase, Matsumoto (JP)

(73) Assignee: Seiko Epson Corporation

( * ) Notice: Subject to any disclaimer, the term of this patent is extended or adjusted under 35 U.S.C. 154(b) by 0 days.

(21) Appl. No.: 16/886,896

(22) Filed: May 29, 2020

(65) Prior Publication Data

US 2020/0376854 A1  Dec. 3, 2020

(30) Foreign Application Priority Data

May 31, 2019  (JP) .............................. JP2019-101994

(51) Int. Cl.
*B41J 2/21* (2006.01)
*C08L 75/04* (2006.01)
(Continued)

(52) U.S. Cl.
CPC ......... *B41J 2/2114* (2013.01); *B41J 2/04501* (2013.01); *C08L 75/04* (2013.01); *C09D 11/30* (2013.01)

(58) Field of Classification Search
CPC ..... B41J 2/01; B41J 2/11; B41J 2/1433; B41J 2/17; B41J 2/17593; B41J 2/2107; B41J 2/1755; B41J 2/114; B41J 2/2117; B41J 2/2056; B41J 2/21; B41J 2/0057; B41J 3/60; B41J 2002/012; B41J 2/04598; B41J 11/0021; B41J 2/00; B41J 11/002; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 2/04581; B41J 2/055; B41J 2/16538; B41J 2002/16502; B41J 29/02; B41J 2/17513; B41J 2/17509; B41J 29/13; B41J 2/17553; B41J 2/1606;
(Continued)

(56) References Cited

U.S. PATENT DOCUMENTS

| 2009/0053409 A1* | 2/2009 | Yamamoto ........... B41M 5/0017 427/195 |
| 2009/0126584 A1* | 5/2009 | Nakano .................... B41M 5/52 101/128.21 |

(Continued)

FOREIGN PATENT DOCUMENTS

| JP | 2005-081754 A | 3/2005 |
| JP | 2011-177967 A | 9/2011 |

(Continued)

*Primary Examiner* — Manish S Shah
(74) *Attorney, Agent, or Firm* — Harness, Dickey & Pierce, P.L.C.

(57) ABSTRACT

An ink jet recording method includes: a step of forming an image by ejecting liquid droplets of an aqueous color ink to a recording medium; and a step of forming a coating ink layer by ejecting liquid droplets of an aqueous coating ink on the image, and in the ink jet recording method described above, the aqueous color ink is ejected in the form of a plurality of liquid droplets having different liquid droplet amounts per one droplet, and the aqueous coating ink is ejected to have a liquid droplet amount per one droplet smaller than a liquid droplet amount of a smallest liquid droplet of the aqueous color ink.

5 Claims, 1 Drawing Sheet

(51) Int. Cl.
*C09D 11/30* (2014.01)
*B41J 2/045* (2006.01)

(58) Field of Classification Search
CPC ........ B41J 2/1642; B41J 2/1609; B41J 2/164;
B41J 2/162; B41J 2/161; B41J 2/19;
B41J 15/04; B41J 25/001; B41J 25/34;
B41J 25/003; B41J 25/312; B41J
2025/008; B41J 2202/21; B41J 2/17596;
B41J 2/16508; B41J 2/1652; B41J 2/175;
B41J 2/17563; C09D 11/107; C09D
11/322; C09D 11/101; C09D 11/326;
C09D 11/38; C09D 11/36; C09D 11/40;
C09D 11/30; C09D 11/32; C09D 11/324;
C09D 11/328; C09D 11/102; C09D
11/005; C09D 11/54; C09D 11/52; C09D
11/106; B41M 5/0023; B41M 7/0081;
B41M 3/006; B41M 3/003; B41M
5/0011; B41M 5/0017; B41M 5/0047;
B41M 7/00; B41M 7/0072; B41M 5/52;
B41M 5/5218; B41M 5/227; G02B 5/20;
G02B 5/223; C08K 3/11; C08K
2003/2237

See application file for complete search history.

(56) References Cited

U.S. PATENT DOCUMENTS

| 2011/0210998 | A1 | 9/2011 | Kaneko et al. |
| 2012/0050356 | A1 | 3/2012 | Seki |
| 2013/0230701 | A1* | 9/2013 | Mochizuki ............. C09D 11/54 428/195.1 |
| 2013/0300788 | A1 | 11/2013 | Konno et al. |
| 2013/0335495 | A1* | 12/2013 | Umebayashi .......... B41J 11/002 347/102 |
| 2014/0285558 | A1* | 9/2014 | Wada .................... B41J 2/2114 347/14 |
| 2018/0001669 | A1* | 1/2018 | Furukawa ............. B41J 11/002 |

FOREIGN PATENT DOCUMENTS

| JP | 2012-051210 A | 3/2012 |
| JP | 2012-056088 A | 3/2012 |
| JP | 2013-233713 A | 11/2013 |

* cited by examiner

SUB SCANNING DIRECTION

MAIN SCANNING DIRECTION

INK JET RECORDING METHOD

The present application is based on, and claims priority from JP Application Serial Number 2019-101994, filed May 31, 2019, the disclosure of which is hereby incorporated by reference herein in its entirety.

BACKGROUND

1. Technical Field

The present disclosure relates to an ink jet recording method.

2. Related Art

Heretofore, there has been known an ink jet recording apparatus which records an image by ejecting a liquid (such as an ink) from a nozzle so as to land liquid droplets (ink dots) on a recording medium. According to the ink jet recording apparatus as described above, a recording method has been known in which, after an image is recorded using general color inks (such as KCMY color inks), an overcoat layer is formed on the image using an over coating ink (such as a transparent ink) to improve image quality or the like.

JP-A-2005-81754 has disclosed that in an ink jet recording method in which after an image is formed on ink jet recording paper using a color ink, a protective film layer is formed over the entire image by ejecting a colorless ink thereon, a liquid droplet amount of the colorless ink is set to 1.0 to 5.0 picoliter (pl), and the protective film layer is formed to have a dried solid component of 0.05 to 0.3 g per one square meter of the ink jet recording paper.

JP-A-2011-177967 has disclosed a recording method comprising a first application step of, during or after a step of recording an image on a recording medium using a color ink, applying a transparent ink on the image; and a second application step of, after the transparent ink thus applied is fixed, again applying the transparent ink on the image. JP-A-2011-177967 has disclosed that since convex portions are formed using the transparent ink droplets ejected in the first and the second application steps, light rays having various wavelengths (colors) can be included in reflected light from a recorded material.

However, even by the two methods described above, while interference fringes are suppressed by using a coating ink, that is, the colorless ink or the transparent ink, the black density and the image clarity of the image cannot be simultaneously obtained at a high level.

Although the liquid droplet amount per one droplet of the color ink is fixed in JP-A-2005-81754, in order to satisfy an image quality and a printing rate which have been recently required, the color ink is required to be ejected in the form of droplets having a plurality of liquid droplet amounts. The image clarity of a color image in the case described above has not been investigated.

According to the method disclosed in JP-A-2011-177967, although the interference fringes are not likely to be recognized by the irregularities of the surface of the image, since the light rays having various wavelengths (colors) are included in the reflected light, the image is liable to look whitish as a whole, and hence, desired black density and image clarity cannot be secured.

SUMMARY

The present disclosure is to provide an ink jet recording method in which while interference fringes are suppressed by using a coating ink, the black density and the image clarity of an image can be simultaneously improved.

An ink jet recording method according to an aspect of the present disclosure comprises: a step of forming an image by ejecting liquid droplets of an aqueous color ink to a recording medium; and a step of forming a coating ink layer by ejecting liquid droplets of an aqueous coating ink on the image, and in the ink jet recording method described above, the aqueous color ink is ejected in the form of a plurality of liquid droplets having different liquid droplet amounts per one droplet, and the aqueous coating ink is ejected to have a liquid droplet amount per one droplet smaller than a liquid droplet amount of a smallest liquid droplet of the aqueous color ink.

DESCRIPTION OF EXEMPLARY EMBODIMENTS

Figure 1:
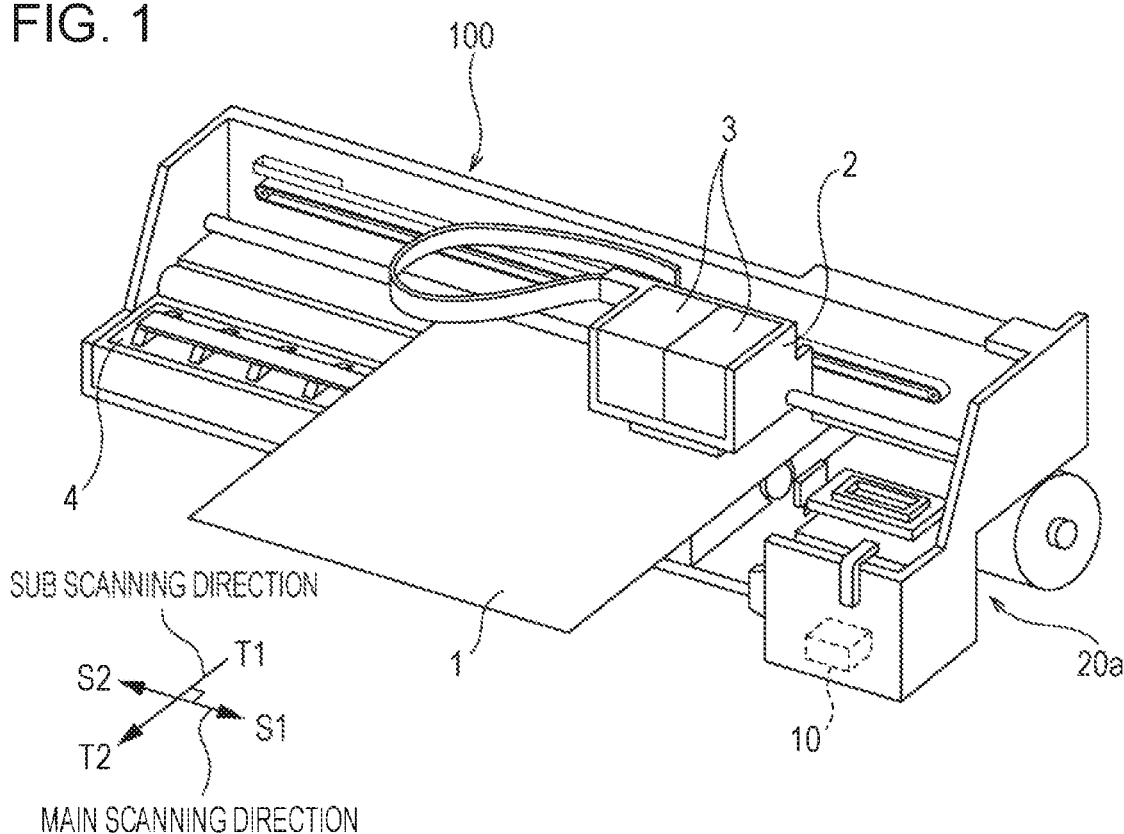
FIG. 1 is a schematic view of an ink jet apparatus used for an ink jet recording method of this embodiment.

Hereinafter, if needed, with reference to the drawings, although an embodiment (hereinafter, referred to as "this embodiment") of the present disclosure will be described in detail, the present disclosure is not limited thereto and may be variously changed and/or modified without departing from the scope of the present disclosure. In addition, in the drawings, the same element is designated by the same reference numeral, and duplicated description will be omitted. In addition, the positional relationship, such as top to bottom and/or left to right, is based on the positional relationship shown in the drawing unless otherwise particularly noted. Furthermore, the dimensional ratio in the drawing is basically in accordance with that shown therein.

Hereinafter, after a color ink, a coating ink, and an ink jet apparatus which are to be used for an ink jet recording method according to this embodiment are described, the ink jet recording method of this embodiment will be described. In addition, when the color ink and the coating inks are not required to be discriminated from each other, they are each simply called an ink.

Color Ink

The color ink of this embodiment is an aqueous ink containing a color material. Hereinafter, components contained in the color ink will be described.

As the color material, although a pigment or a dye may be used, a pigment is preferably used. As the pigment, although either a self-dispersible type pigment or a resin-dispersible type pigment may be used, a resin-dispersible type pigment is preferably used. When the resin-dispersible type pigment is used, the glossiness of an image can be improved. In addition, the self-dispersible pigment is a pigment capable of dispersing in an aqueous medium without using a dispersant. In this case, "capable of dispersing in an aqueous medium without using a dispersant" indicates the state in which without using a dispersant to disperse a pigment, the pigment is stably present in an aqueous medium by hydrophilic groups present on the surface of the pigment. Hereinafter, pigments of the color ink will be described by way of example.

Although a pigment used for a black ink is not particularly limited, a carbon black may be mentioned. Either a resin-dispersible type carbon black or a self-dispersible type carbon black may be used.

Although a pigment used for a white ink is not particularly limited, for example, there may be mentioned a white inorganic pigment, such as C.I. Pigment White 6, 18, or 21, titanium oxide, zinc oxide, zinc sulfide, antimony oxide, magnesium oxide, or zirconium oxide. Other than the white inorganic pigments mentioned above, a white organic pigment, such as white hollow resin particles or white high molecular weight particles, may also be used.

Although a pigment used for a yellow ink is not particularly limited, for example, there may be mentioned C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, or 180.

Although a pigment used for a magenta ink is not particularly limited, for example, there may be mentioned C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224, or 245, or C.I. Pigment Violet 19, 23, 32, 33, 36, 38, 43, or 50.

Although a pigment used for a cyan ink is not particularly limited, for example, there may be mentioned C.I. Pigment Blue 1, 2, 3, 15, 15:1, 15:2, 15:3, 15:34, 15:4, 16, 18, 22, 25, 60, 65, or 66, or C.I. Vat Blue 4 or 60.

In addition, although a pigment used for a color ink other than magenta, cyan, and yellow is not particularly limited, for example, there may be mentioned C.I. Pigment Green 7 or 10, C.I. Pigment Brown 3, 5, 25, or 26, C.I. Pigment Orange 1, 2, 5, 7, 13, 14, 15, 16, 24, 34, 36, 38, 40, 43, or 63.

The content of the pigment is with respect to 100 percent by mass of the ink, preferably 0.4 to 12 percent by mass, more preferably 1 to 8 percent by mass, and further preferably 2 to 5 percent by mass.

The color ink of this embodiment contains water. As the water, for example, there may be mentioned pure water, such as ion-exchanged water, ultrafiltration water, reverse osmosis water, or distilled water, or water, such as ultrapure water, in which ionic impurities are removed as much as possible. In addition, if water sterilized by ultraviolet irradiation or addition of hydrogen peroxide is used, when a pigment dispersion liquid and an ink using the same are stored for a long time, the generation of fungi and/or bacteria can be prevented.

Although the content of the water is not particularly limited, according to the present disclosure, the content of the water is preferably larger than that of an organic solvent. In addition, the ink is a so-called "aqueous ink", and as a solvent component contained in the ink, the water is at least contained as a primary component. The content of the water is with respect to 100 percent by mass of the aqueous ink, preferably 40 to 95 percent by mass, more preferably 45 to 90 percent by mass, and further preferably 50 to 80 percent by mass.

The color ink of this embodiment may contain a resin. The color ink preferably contains resin particles as the resin. Accordingly, the fixability and the friction resistance of an image can be improved. The resin particles may be used, for example, in the form of resin emulsion.

Although the type of resin is not particularly limited, for example, there may be mentioned a homopolymer or a copolymer of an acrylic-based monomer, such as (meth) acrylic acid, a (meth)acrylate ester, acrylonitrile, cyanoacrylate, or acrylamide, an olefin, styrene, vinyl acetate, vinyl chloride, vinyl alcohol, vinyl ether, vinyl pyrrolidone, vinyl pyridine, vinyl carbazole, vinyl imidazole, or vinylidene chloride; a fluorine resin, a natural resin, an urethane resin, or a polyester resin.

As a component (monomer component used for polymerization of the resin) forming the resin, when at least an acrylic-based monomer is used, this resin is called an acrylic-based resin. The acrylic-based resin may be a copolymer of an acrylic-based monomer and a monomer other than the acrylic-based monomer. The acrylic-based resin is a homopolymer or a copolymer using at least an acrylic-based monomer. Among the acrylic-based resins, a vinyl-acryl copolymer using an acrylic-based monomer and a vinyl-based monomer is preferable, a styrene-acrylic copolymer using a styrene as a vinyl-based monomer is more preferable, and a copolymer resin using at least styrene and (meth)acrylic acid is further preferable.

Among the resins, an acrylic-based resin, an urethane resin, or a polyester resin is preferable, and an urethane resin is more preferable.

In addition, the copolymer described above may be any one of a random copolymer, a block copolymer, an alternate copolymer, and a graft copolymer.

Although the resin described above is not particularly limited, for example, the resin can be obtained by the following preparation method, and if needed, a plurality of methods may be used in combination. As the preparation method, for example, there may be mentioned a method in which polymerization (emulsion polymerization) is performed by mixing a polymerization catalyst (polymerization initiator) and a dispersant with monomers for components forming a desired resin, a method in which after a solution obtained by dissolving a resin having a hydrophilic portion in a water-soluble organic solvent is mixed with water, the water-soluble organic solvent is removed by distillation or the like, or a method in which a solution obtained by dissolving a resin in a non-water-soluble organic solvent is mixed together with a dispersant in an aqueous solution.

The content of the resin is preferably 1 to 15 percent by mass, more preferably 2 to 10 percent by mass, and further preferably 3 to 7 percent by mass. When the content of the resin is set in the range described above, while the friction resistance is improved, the resin can be stably dissolved, and the ejection stability can be improved.

The color ink may contain a water-soluble organic solvent. The water-soluble organic solvent described above is primarily used to prevent the generation of precipitation from the color ink at a front end of a recording head and the drying of the color ink. Although the above water-soluble solvent is not particularly limited, a water-soluble organic solvent having a low volatile property and a high dye solubility is preferable, and for example, there may be mentioned a polyalkylene glycol such as a polyethylene glycol; an alkylene glycol, such as ethylene glycol, propylene glycol, butylene glycol, diethylene glycol, dipropylene glycol, triethylene glycol, tripropylene glycol, 1,2,6-hexanetriol, thiodiglycol, 1,3-butanediol, 1,5-pentqandiol, or hexylene glycol; glycerin; or a pyrrolidone, such as 2-pyrrolidone or N-methyl-2-pyrrolidone. Those water-soluble organic solvents may be used alone, or at least two types thereof may be used in combination.

The content of the water-soluble organic solvent described above is preferably 5 to 40 percent by mass. When the content is less than 5 percent by mass, a moisturizing action becomes insufficient, and problems, such as the precipitation and/or the drying, may arise in some cases. When the content is more than 40 percent by mass, the viscosity of the color ink is unfavorably increased, and as a result, problems may arise in some cases, that is, for example, the ejection may not be carried out, and/or the drying on recording paper may require an extraordinarily long time. The content of the water-soluble organic solvent is more preferably 7 to 40 percent by mass and further preferably 10 to 35 percent by mass.

In addition, in order to control the permeability, if needed, a polyvalent alcohol monoalkyl ether may also be used. Since effectively increasing a permeability rate of an ink into recording paper, the polyvalent alcohol monoalkyl ether improves a quick drying property of the ink on the paper and can prevent bleeding (blurring at the boundary between different colors) caused by a slow drying property on the recording paper and/or feathering (whisker blurring along fibers of paper) in association with the permeation. As the polyvalent alcohol monoalkyl ether, for example, there may be mentioned 1,2-hexanediol, diethylene glycol monomethyl ether, diethylene glycol monobutyl ether, diethylene glycol monoisobutyl ether, diethylene glycol monohexyl ether, diethylene glycol 2-ethylhexyl ether, dipropylene glycol monomethyl ether, dipropylene glycol monopropyl ether, dipropylene glycol monoisopropyl ether, dipropylene glycol monobutyl ether, triethylene glycol monomethyl ether, triethylene glycol monobutyl ether, tripropylene glycol monomethyl ether, or tripropylene glycol monobutyl ether.

The content of the polyvalent alcohol monoalkyl ether described above is preferably 0.3 to 15 percent by mass. When the content is less than 0.3 percent by mass, since the permeability rate of the ink into the recording paper is slow, problems in terms of drying time and blurring may arise in some cases. When the content is more than 15 percent by mass, since the permeability rate of the ink into the recording paper is excessively increased, the ink may unfavorably reach a rear side of the recording paper or cause blurring in some cases, and in addition, the volume of mist to be generated may be increased in some cases. The content of the polyvalent alcohol monoalkyl ether is more preferably 0.5 to 10 percent by mass. In addition, in order to control the permeability of the ink into the recording media and the drying property of the ink, a monovalent alcohol, such as ethanol or isopropyl alcohol, may also be used.

Although the basic structure of the color ink is as described above, in addition to those described above, if needed, for example, a resin binder, a dispersant, a surfactant, a viscosity adjuster, a surface tension adjuster, a pH adjuster, a dye solubilizer, an antiseptic agent/fungicide, and/or an antirust agent, each of which has been known in the past, may also be added.

Coating Ink

The coating ink according to this embodiment contains a resin. The coating ink of this embodiment preferably contains resin particles as the resin. The coating ink is not an ink used to color a recording medium and is an ink used to improve the quality and the durability of an image. The content of a color material of the coating ink is preferably 0.5 percent by mass or less and may also be 0 percent by mass. When the coating ink contains a color material, this ink may also be used to color a recording medium.

When containing a color material, the coating ink is preferably a light gray ink. The light gray ink is an ink containing 0.5 percent by mass or less of a pigment to be used for a black ink and is preferably an ink containing 0.3 percent by mass or less of the pigment. Since the light gray ink may also be used as a color ink to form an image, when the coating ink is a light gray ink, the use efficiency of the ink can be improved. In addition, when the coating ink is a light gray ink, at least one ink different from this light gray ink is to be used as the color ink.

The coating ink may be a clear ink which substantially contains no color material. The content of the color material of the clear ink is preferably 0.2 percent by mass or less, more preferably 0.1 percent by mass or less, and further preferably 0.05 percent by mass or less, and the lower limit of the content may be 0 percent by mass.

As the resin contained in the coating ink, among the resins mentioned for the color ink, a resin having a refractive index of approximately 1.5 to 1.7 and a low wettability may be preferably used, and as the resin as described above, for example, an urethane-based resin may be mentioned. The wettability of the resin can be defined by a contact angle. For example, a contact angle of the coating ink with respect to an image formed by the color ink within 2,000 to 5,000 milliseconds is preferably 8° to 13°. The reason a resin having a high refractive index can be preferably used is that when a coating ink layer containing a resin having a high refractive index is formed, the amount of specular reflection light passing through the coating ink layer can be increased, and hence, the image clarity can be improved. In addition, the reason a resin having a low wettability can be preferably used is that as described below, when the coating ink layer is formed from fine dots, since the surface irregularity of the coating ink layer can be reduced, the diffusion reflection is suppressed, and the black density of the image can be improved.

The content of the resin contained in the coating ink is with respect to the total mass of the ink, preferably 1 to 15 percent by mass, more preferably 2 to 10 percent by mass, and further preferably 3 to 7 percent by mass. When the content of the resin is set in the range described above, and when the coating ink layer is formed from fine dots as described below, while the interference fringes are suppressed, the black density and the image clarity of the image can be simultaneously improved.

Although the content of water in the coating ink is not particularly limited, the content of water is preferably larger than that of an organic solvent. In addition, the coating ink is a so-called "aqueous ink", and as a solvent component contained in the ink, water is at least contained as a primary component. The content of the water is with respect to 100 percent by mass of the ink, preferably 40 to 95 percent by mass, more preferably 45 to 90 percent by mass, and further preferably 50 to 80 percent by mass.

As is the case of the color ink, the coating ink may also contain a water-soluble organic solvent. The type of water-soluble organic solvent is the same as that described for the color ink.

Although the basic structure of the coating ink is as described above, in addition to those described above, if needed, for example, a resin binder, a dispersant, a surfactant, a viscosity adjuster, a surface tension adjuster, a pH adjuster, a dye solubilizer, an antiseptic agent/fungicide, and/or an antirust agent, each of which has been known in the past, may also be added.

Recording Apparatus

A recording apparatus according to this embodiment is a recording apparatus which performs recording by the recording method of this embodiment. In addition, the recording apparatus according to this embodiment comprises an ink jet head ejecting the color ink described above and an ink jet head ejecting the coating ink described above. Hereinafter, one example of the structure of the recording apparatus according to this embodiment will be described.

FIG. 1 is a schematic cross-sectional view showing one example of a recording apparatus (ink jet apparatus) to be used for the ink jet recording method according to this embodiment. As shown in FIG. 1, an ink jet apparatus 100 comprises a carriage 2, ink jet heads 3, and a platen 4.

The ink jet heads 3 are mounted on the carriage 2 and include a plurality of nozzle lines each of which ejects a color ink or a coating ink. In each of the nozzle lines, a plurality of nozzle holes is arranged. The ink jet recording apparatus 100 is a so-called a serial type ink jet recording apparatus. The serial type ink jet recording apparatus is an apparatus in which the ink jet heads 3 are mounted on the carriage 2 which is transferred in a predetermined direction, and in association with the transfer of the carriage 2 in a main scanning direction, the ink jet heads 3 are transferred, and liquid droplets are ejected on a recording medium 1. While the carriage 2 is transferred in the main scanning direction which is a front-to-rear direction on the plane, main scanning is performed such that the inks are ejected from the ink jet heads 3 mounted on the carriage 2 and are adhered to the recording medium.

Figure 2:
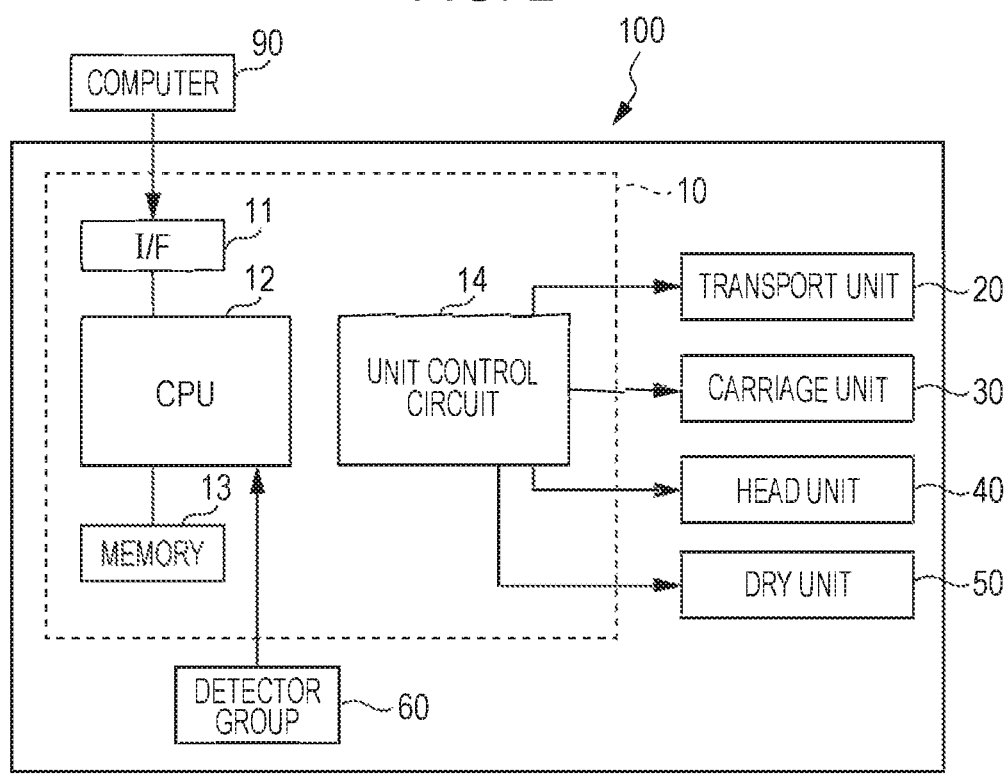
FIG. 2 is a block diagram of the ink jet apparatus used for the ink jet recording method of this embodiment.

FIG. 2 is a functional block diagram of the ink jet recording apparatus 100.

A controller 10 is a control unit controlling the ink jet recording apparatus 100. An interface portion 11 (I/F) is responsible to send and receive data between a computer 90 and the ink jet recording apparatus 100. A CPU 12 is an arithmetic processing device which controls the entire ink jet recording apparatus 100. A memory 13 is a device which secures a region in which the program of the CPU 12 is stored, an operation region, and the like. The CPU 12 controls individual units by a unit control circuit 14. In addition, the state in the ink jet recording apparatus is monitored by a detector group 60, and based on the detection result thereof, the controller 10 controls the individual units.

A transport unit 20 is a unit to control a sub scanning (transportation) of the ink jet recording and, in particular, is a unit to control a transport direction and a transport rate of the recording medium 1. In particular, by controlling a rotation direction and a rotation rate of a transportation roller 20a to be driven by a motor, the transport direction and the transport rate of the recording medium 1 are controlled.

A carriage unit 30 is a unit to control a main scanning (pass) of the ink jet recording and, in particular, is a unit to reciprocally transfer the ink jet heads 3 in the main scanning direction. The carriage unit 30 includes the carriage 2 mounting the ink jet heads 3 and a carriage transfer mechanism to reciprocally transfer the carriage 2.

A head unit 40 is a unit to control a dot size and an ejection amount of the color ink or the coating ink from a nozzle of the ink jet head. For example, when the nozzle of the ink jet head is driven by a piezoelectric element, the head unit 40 controls the operation of the piezoelectric element of each nozzle. By the head unit 40, a time from adhesion of a treatment liquid to adhesion of the ink and a dot size of the treatment liquid are controlled. In addition, by combination between the control of the carriage unit 30 and that of the head unit 40, an adhesion amount of the treatment liquid per one scanning is controlled.

A dry unit 50 is a unit to control the temperatures of various heaters, such as an IR heater, a pre-heater, a platen heater, and an after heater.

The ink jet recording apparatus 100 described above alternately repeats the operation to transfer the carriage 2 mounting the ink jet heads 3 in the main scanning direction and the transport operation (sub scanning). In this case, at every pass, the controller 10 controls the carriage unit 30 to transfer the ink jet heads 3 in the main scanning direction and also controls the head unit 40 so that a liquid droplet of the color ink or the coating ink is ejected from a predetermined nozzle hole of the ink jet head 3 and is then adhered to the recording medium 1. In addition, the controller 10 controls the transport unit 20 to transport the recording medium 1 by a predetermined transport amount in the transport direction at the transport operation.

Since the pass and the transport operation are repeatedly performed, a recording region to which a plurality of liquid droplets (dots) is adhered is gradually transported. In addition, the liquid droplets adhered to the recording medium are dried, so that an image is formed. Subsequently, the recorded material thus formed may be wound into a roll shape by a winding mechanism (not shown) or may be transported by a flat bed mechanism (not shown).

As the recording medium to be used for the ink jet method of this embodiment, for example, although an absorbent recording medium, a non-absorbent recording medium, or a low-absorbent recording medium may be mentioned, an absorbent recording medium is preferably used. Among absorbent recording media, an absorbent recording medium including an ink receiving layer as a recording surface is particularly preferable. As an example of the absorbent recording medium including an ink receiving layer as a recording surface, photo paper (Gloss) (KA450PSKR, manufactured by Seiko Epson Corporation) may be mentioned.

In this embodiment, the "low-absorbent recording medium" and the "non-absorbent recording medium" each indicate a recording medium in which the amount of water absorption within 30 milliseconds from the start of contact in Bristow method is 10 mL/m$^2$ or less. This Bristow method is a most popular method as a measurement method of the amount of liquid absorption in a short period and is also employed by Japan Technical Association of the Pulp and Paper Industry (Japan TAPPI). The details of the test method has been disclosed in "Standard No. 51 "Paper and Paperboard-Liquid Absorption Test Method-Bristow Method", JAPAN TAPPI PAPER AND PULP TEST METHODS, 2000.

Ink Jet Recording Method

The ink jet recording method according to this embodiment comprises: a step of forming an image by ejecting liquid droplets of an aqueous color ink to a recording medium from an ink jet head; and a step of forming a coating ink layer on the image by ejecting liquid droplets of an aqueous coating ink from an ink jet head.

In the step of forming an image by ejecting liquid droplets of an aqueous color ink, the image is formed by ejecting a plurality of liquid droplet amounts per one droplet of the aqueous color ink. The difference in liquid droplet amount is preferably 1 ng or more and more preferably 3 ng or more. As described above, when a plurality of liquid droplet sizes is used in combination, the granularity of the image can be reduced, and the image quality can be improved.

In the step of forming a coating ink layer, the liquid droplet amount per one droplet of the coating ink is preferably smaller than the liquid droplet amount of a smallest droplet of the aqueous color ink and is more preferably one half or less of that of the smallest droplet of the aqueous color ink. In addition, the liquid droplet amount per one droplet of the coating ink is preferably set to 1.0 to 3.0 ng. Since the coating ink layer is formed using fine dots as described above, the surface irregularity of the coating ink layer is reduced, and while the interference fringes are suppressed, the black density and the image clarity of the image can be simultaneously improved.

The thickness of the coating ink layer is preferably 0.05 to 0.75 μm. Since the thin coating ink layer as described above is formed, the interference fringes derived from the coating ink layer can be suppressed from appearing on the image.

The step of forming a coating ink layer may be performed either immediately after the formation of the image by ejecting the liquid droplets of the aqueous color ink or after the image is pre-dried.

According to the ink jet recording method of this embodiment, by using the coating ink, while the interference fringes are suppressed, the black density and the image clarity of the image can be simultaneously improved.

EXAMPLES

Hereinafter, the present disclosure will be described in more detail with reference to Examples and Comparative Examples. The present disclosure is not limited to the following Examples.

Individual inks were prepared as described below.

| PREPARATION OF BLACK INK | |
|---|---|
| Carbon black pigment (C.I. Pigment Black 7) | solid component: 3 percent by mass |
| Urethane resin (Takelac W6010, manufactured by Mitsui Chemicals & Polyurethane Inc.) | solid component: 1 percent by mass |
| Sulfonated isoprene resin (Dynaflow K201, manufactured by JSR Corporation) | solid component: 0.5 percent by mass |
| Silicone-based surfactant (BYK-348, manufactured by BYK Japan KK) | 0.5 percent by mass |
| Glycerin | 10 percent by mass |
| Triethylene glycol | 15 percent by mass |
| 1,2-hexanediol | 5 percent by mass |
| Pure water | balance |

Those compounds were mixed together and then filtrated using a 5-μm filter, so that an ink was prepared.

| PREPARATION OF DEEP COLOR INK | |
|---|---|
| Color pigments (cyan ink: C.I. Pigment Blue 15:3, yellow ink: C.I. Pigment Yellow 74, magenta ink: C.I. Pigment Red 122) | solid component: 5 percent by mass |
| Urethane resin (Takelac W6010) | solid component: 1 percent by mass |
| Sulfonated isoprene resin (Dynaflow K201) | solid component: 0.5 percent by mass |
| Silicone-based surfactant (BYK-348) | 0.5 percent by mass |
| Glycerin | 10 percent by mass |
| Triethylene glycol | 15 percent by mass |
| 1,2-hexanediol | 5 percent by mass |
| Pure water | balance |

Those compounds were mixed together and then filtrated using a 10-μm filter, so that an ink was prepared.

| PREPARATION OF LIGHT COLOR INK | |
|---|---|
| Color pigments (gray ink: C.I. Pigment Black 7, light cyan ink: C.I. Pigment Blue 15:3, light magenta ink: C.I. Pigment Red 122) | solid component: 1 percent by mass |
| Urethane resin (Takelac W6010) | solid component: 2 percent by mass |
| Sulfonated isoprene resin (Dynaflow K201) | solid component: 0.5 percent by mass |
| Silicone-based surfactant (BYK-348) | 0.5 percent by mass |
| Glycerin | 10 percent by mass |
| Triethylene glycol | 15 percent by mass |
| 1,2-hexanediol | 5 percent by mass |
| Pure water | balance |

Those compounds were mixed together and then filtrated using a 10-μm filter, so that an ink was prepared.

| PREPARATION OF CLEAR INK | |
|---|---|
| Urethane resin (Takelac W6010) | solid component: 3 percent by mass |
| Silicone-based surfactant (BYK-348) | 0.5 percent by mass |
| Glycerin | 10 percent by mass |
| Triethylene glycol | 15 percent by mass |
| 1,2-hexanediol | 5 percent by mass |
| Pure water | balance |

Those compounds were mixed together and then filtrated using a 5-μm filter, so that an ink was prepared.

| PREPARATION OF LIGHT GRAY INK | |
|---|---|
| Carbon black pigment (C.I. Pigment Black 7) | solid component: 0.3 percent by mass |
| Urethane resin (Takelac W6010) | solid component: 3.0 percent by mass |
| Silicone-based surfactant (BYK-348) | 0.5 percent by mass |
| Glycerin | 10 percent by mass |
| Triethylene glycol | 15 percent by mass |
| 1,2-hexanediol | 5 percent by mass |
| Pure water | balance |

Those compounds were mixed together and then filtrated using a 5-μm filter, so that an ink was prepared.

As shown in Table 1, recording was performed by changing various conditions of an ink jet recording method, and various types of evaluations were performed. Hereinafter, the conditions of the recording method and the details of each evaluation test will be described.

TABLE 1

| | | COATING INK | | | | EVALUATION RESULT RED IMAGE | |
|---|---|---|---|---|---|---|---|
| | COLOR INK DOT RATIO | TYPE | DOT SIZE [ng] | DOT SIZE RATE (DOT OF COATING INK/ SMALLEST DOT OF COLOR INK) | | IMAGE CLARITY | GRANULARITY |
| EXAMPLE 1 | PATTERN 1 | CLEAR INK | 1.5 | 0.5 | | B | A |

TABLE 1-continued

| | Pattern | Ink | | | | |
|---|---|---|---|---|---|---|
| EXAMPLE 2 | PATTERN 1 | CLEAR INK | 3.0 | 1.0 | B | A |
| EXAMPLE 3 | PATTERN 1 | LIGHT GRAY INK | 1.5 | 0.5 | B | B |
| EXAMPLE 4 | PATTERN 1 | LIGHT GRAY INK | 3.0 | 1.0 | C | C |
| COMPARATIVE EXAMPLE 1 | PATTERN 1 | — | — | — | D | A |
| COMPARATIVE EXAMPLE 2 | PATTERN 2 | — | — | — | D | D |
| COMPARATIVE EXAMPLE 3 | PATTERN 1 | CLEAR INK | 6.0 | 2.0 | D | A |
| COMPARATIVE EXAMPLE 4 | PATTERN 1 | CLEAR INK | 12.0 | 4.0 | D | A |
| COMPARATIVE EXAMPLE 5 | PATTERN 2 | CLEAR INK | 1.5 | 0.25 | B | D |
| COMPARATIVE EXAMPLE 6 | PATTERN 2 | CLEAR INK | 12.0 | 4.0 | D | D |

| | EVALUATION RESULT | | | |
|---|---|---|---|---|
| | BLUE IMAGE | | GREEN IMAGE | |
| | IMAGE CLARITY | GRANULARITY | IMAGE CLARITY | GRANULARITY |
| EXAMPLE 1 | B | A | B | A |
| EXAMPLE 2 | B | A | B | A |
| EXAMPLE 3 | B | B | B | B |
| EXAMPLE 4 | C | C | C | C |
| COMPARATIVE EXAMPLE 1 | D | A | D | A |
| COMPARATIVE EXAMPLE 2 | D | D | D | D |
| COMPARATIVE EXAMPLE 3 | D | A | D | A |
| COMPARATIVE EXAMPLE 4 | D | A | D | A |
| COMPARATIVE EXAMPLE 5 | B | D | B | D |
| COMPARATIVE EXAMPLE 6 | D | D | D | D |

| | EVALUATION RESULT BLACK IMAGE | | | |
|---|---|---|---|---|
| | IMAGE CLARITY | GRANULARITY | OD VALUE | INTERFERENCE IRREGULARITY |
| EXAMPLE 1 | A | A | A | A |
| EXAMPLE 2 | B | A | A | B |
| EXAMPLE 3 | A | A | B | B |
| EXAMPLE 4 | B | B | B | C |
| COMPARATIVE EXAMPLE 1 | C | A | D | A |
| COMPARATIVE EXAMPLE 2 | C | D | D | A |
| COMPARATIVE EXAMPLE 3 | C | A | B | C |
| COMPARATIVE EXAMPLE 4 | D | A | C | D |
| COMPARATIVE EXAMPLE 5 | A | C | A | A |
| COMPARATIVE EXAMPLE 6 | D | C | C | D |

Conditions of Recording Method

After a print sample was formed using SC-PX5VII (manufactured by Seiko Epson Corporation) as a recording apparatus and photo paper <Gloss>(KA450PSKR, manufactured by Seiko Epson Corporation) as a recording medium, the print sample was left in a stationary manner for 12 hours after printing and was then evaluated.

As the dot sizes of the color ink, the gray ink, and the black ink, the following three types were used.

S dot: 3.0 ng, M dot: 6.0 ng, L dot: 12.0 ng

The above three types of dots were used in combination, and the print sample was formed at the following dot rate.

Pattern 1: S 30%, M 60%, and L 10%

Pattern 2: S 0%, M 100%, and L 0%

Ink Distribution of Print Sample

Red image: magenta ink 50%, light magenta ink 10%, yellow ink 40%

Blue image: cyan ink 20%, light cyan ink 30%, magenta ink 10%, light magenta ink 40%

Green image: cyan ink 10%, light cyan ink 50%, yellow ink 40%

Black image: black ink 95%, gray ink 5%

A sample having a gradation patch pattern was formed such that the duty of each color was changed by every 10% in a range of from 10 to 100%.

In addition, the coating ink was ejected to each print sample other than those of Comparative Examples 1 and 2 at an ink ejection amount of 10 mg/inch$^2$, so that a coating ink layer was formed.

Evaluation Of Black OD Value

The OD value of the print sample (patch portion having a black duty of 100%) was measured using "Spectrolino" manufactured by Gretag Macbeth as an optical densitometer. The evaluation criteria are as follows.

Evaluation Criteria

A: OD value of 2.85 or more
B: OD value of 2.65 to less than 2.85
C: OD value of 2.45 to less than 2.65
D: OD value of less than 2.45

Evaluation of Image Clarity

A C value (%) of the print sample (each color patch portion having a duty of 100%) was measured at a reflection of 45° and an optical comb of 2 mm by an image clarity meter ICM-1T (manufactured by Suga Test Instruments Co., Ltd). The evaluation criteria are as follows.

Evaluation Criteria

A: C value of 55 or more
B: C value of 45 to less than 55
C: C value of 35 to less than 45
D: C value of less than 35

Evaluation of Interference Irregularity

Interference irregularity of the print sample (patch portion having a black duty of 60% to 100%) was evaluated by visual inspection in accordance with the following evaluation criteria.

Evaluation Criteria

A: No interference irregularity is observed at a distance of less than 30 cm from the sample.
B: No interference irregularity is observed at a distance of 30 cm to less than 50 cm from the sample.
C: No interference irregularity is observed at a distance of 50 cm or more from the sample.
D: Interference irregularity is observed even at a distance of 50 cm or more from the sample.

In addition, the interference irregularity is liable to be clearly observed in the case of no coloration.

Evaluation of Granularity

The print sample (each color patch portion having a duty of 10% to 100%) was observed by visual inspection, and the granularity thereof was then evaluated in accordance with the following evaluation criteria.

Evaluation Criteria

A: No image roughness is observed by visual inspection at a position apart from the sample by 30 cm.
B: No image roughness is observed by visual inspection at a position apart from the sample by 20 cm.
C: No image roughness is observed by visual inspection at a position apart from the sample by 10 cm.
D: Image roughness is observed by visual inspection.

In addition, the entire irregularity (roughness) is liable to be observed when the sample is placed far away from the observer.

According to Examples 1 to 4, in the case in which the clear ink or the light gray ink is used as the coating ink, when the dot size of the clear ink or the light gray ink is controlled, while the interference fringes are suppressed, the black density and the image clarity of the image can be simultaneously improved.

What is claimed is:

1. An ink jet recording method comprising:
   forming an image by ejecting an aqueous color ink to form a plurality of dots on a recording medium; and
   forming a coating ink layer by ejecting an aqueous coating ink on the image,
   wherein each dot of the aqueous color ink is formed by ejecting a plurality of liquid droplets of the aqueous color ink that each have different liquid droplet amounts, and
   the aqueous coating ink layer is formed by ejecting liquid droplets of the aqueous coating ink that each have a liquid droplet amount that is smaller than a liquid droplet amount of a smallest liquid droplet of the aqueous color ink.

2. The ink jet recording method according to claim 1, wherein the liquid droplet amount per one droplet of the aqueous coating ink is 1.0 to 3.0 ng.

3. The ink jet recording method according to claim 1, wherein the aqueous coating ink contains an urethane-based resin.

4. The ink jet recording method according to claim 1, wherein the aqueous coating ink is a clear ink.

5. The ink jet recording method according to claim 1, wherein the aqueous coating ink is a light gray ink, and the aqueous color ink is an ink different from the light gray ink.

* * * * *